United States Patent
Dunkel et al.

(10) Patent No.: US 10,828,655 B2
(45) Date of Patent: Nov. 10, 2020

(54) RESIDUE DETECTION SYSTEM

(71) Applicant: Deere & Company, Moline, IL (US)

(72) Inventors: Kathryn L. Dunkel, Kirkland, WA (US); Richard A. Humpal, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 16/057,273

(22) Filed: Aug. 7, 2018

(65) Prior Publication Data

US 2020/0047206 A1 Feb. 13, 2020

(51) Int. Cl.
*B05B 12/08* (2006.01)
*A01C 23/04* (2006.01)
(Continued)

(52) U.S. Cl.
CPC ............ *B05B 12/08* (2013.01); *A01C 23/047* (2013.01); *A01M 7/005* (2013.01);
(Continued)

(58) Field of Classification Search
None
See application file for complete search history.

(56) References Cited

U.S. PATENT DOCUMENTS 5,125,576 A * 6/1992 Ziegenbein ......... A01M 7/0085
239/113
6,323,033 B1 * 11/2001 van den Berg ......... A01J 7/022
134/18
(Continued)

FOREIGN PATENT DOCUMENTS

DE 102012100450 A1 7/2013
DE 102017220002 A1 * 5/2019 .......... A01M 7/0089
(Continued)

OTHER PUBLICATIONS

Clark, "AutoBatch Chemical Injection System", May 2012, OSU (Year: 2012).*
(Continued)

*Primary Examiner* — Mohammad Ali
*Assistant Examiner* — David Earl Ogg
(74) *Attorney, Agent, or Firm* — Joseph R. Kelly; Kelly, Holt & Christenson, PLLC (57) ABSTRACT

A mobile agricultural sprayer includes a chemical tank that holds a chemical fluid to be sprayed at a worksite and a rinse fluid tank that holds rinse fluid. The mobile agricultural sprayer also includes a first sensor coupled to the rinse fluid tank configured to detect a characteristic of the rinse fluid within the rinse fluid tank, and, generate a first sensor signal indicative of the characteristic of the rinse fluid. The sprayer also includes a distribution system, including a fluidic pathway and a nozzle, configured to pump the rinse fluid from the rinse fluid tank along the fluidic pathway through the nozzle of the sprayer. The sprayer also includes a second sensor coupled to the fluidic pathway configured to detect a characteristic of the fluid within the fluidic pathway, and generate a second sensor signal indicative of the characteristic. The sprayer also includes a residue detection system configured to receive the first and second sensor signals and, based on the received sensor signals, determine a concentration of residue within the fluidic pathway.

20 Claims, 5 Drawing Sheets

(51) Int. Cl.
*A01M 7/00* (2006.01)
*G01N 27/06* (2006.01)

(52) U.S. Cl.
CPC ........ *A01M 7/0042* (2013.01); *A01M 7/0089* (2013.01); *G01N 27/06* (2013.01)

(56) References Cited

U.S. PATENT DOCUMENTS

| | | | |
|---|---|---|---|
| 2006/0196529 A1* | 9/2006 | Kenowski | B08B 9/0325 134/56 R |
| 2013/0140374 A1 | 6/2013 | Adams et al. | |
| 2018/0221923 A1* | 8/2018 | Erickson | C11D 11/0076 |
| 2019/0009285 A1* | 1/2019 | Zimmerman | A01M 7/0089 |

FOREIGN PATENT DOCUMENTS

| | | |
|---|---|---|
| EP | 2617266 A1 | 7/2013 |
| WO | 2017168227 A1 | 10/2017 |

OTHER PUBLICATIONS

European Search Report issued in counterpart European Patent Application No. 19185237.5 dated Feb. 11, 2020 (8 pages).

\* cited by examiner

FIG. 5

RESIDUE DETECTION SYSTEM

FIELD OF THE DESCRIPTION

The present description relates to detecting residue. More specifically, the present description relates to detecting residue present in an agricultural sprayer.

BACKGROUND

There are many different types of agricultural machines. One such machine is a sprayer. An agricultural sprayer often includes a tank or reservoir that holds a substance to be sprayed on an agricultural field. The sprayer also includes a boom that is fitted with one or more nozzles that are used to spray the substance on the field. As the sprayer travels through the field, the boom is moved to a deployed position and the substance is pumped from the tank or reservoir, through the nozzles, so that it is sprayed or applied to the field over which the sprayer is traveling.

Additionally, during a spraying operation, it may be desirable to spray a variety of substances over different areas of the field. However, prior to changing substances, an operator of the sprayer often controls the sprayer to perform one or more clean-out-cycles to remove any excess substance present within the boom after a completed spraying operation. A clean-out-cycle typically involves pumping water with a cleaning reagent through the sprayer and out the nozzles of the sprayer to remove any excess residue left over within the boom. However, if any residue remains within the boom after the clean-out-cycle, the excess residue can be sprayed onto undesired areas of the field which can negatively impact crops and/or areas within the field.

The discussion above is merely provided for general background information and is not intended to be used as an aid in determining the scope of the claimed subject matter.

SUMMARY

A mobile agricultural sprayer includes a chemical tank that holds a chemical fluid to be sprayed at a worksite and a rinse fluid tank that holds rinse fluid. The mobile agricultural sprayer also includes a first sensor coupled to the rinse fluid tank configured to detect a characteristic of the rinse fluid within the rinse fluid tank, and, generate a first sensor signal indicative of the characteristic of the rinse fluid. The sprayer also includes a distribution system, including a fluidic pathway and a nozzle, configured to pump the rinse fluid from the rinse fluid tank along the fluidic pathway through the nozzle of the sprayer. The sprayer also includes a second sensor coupled to the fluidic pathway configured to detect a characteristic of the fluid within the fluidic pathway, and generate a second sensor signal indicative of the characteristic. The sprayer also includes a residue detection system configured to receive the first and second sensor signals and, based on the received sensor signals, determine a concentration of residue within the fluidic pathway.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

During a spraying operation, it may be desirable to spray a variety of fluids through nozzle(s) of an agricultural spraying device onto different areas of an agricultural field. However, after conducting a spraying operation in which a fluid is sprayed through the nozzles of the sprayer, excess fluid may remain within the sprayer. To remove the excess fluid (residue) present within the sprayer, an operator often initiates rinse cycles which includes spraying water with a cleaning agent through the nozzles of the sprayer to remove the residue. However, if any residue remains after the rinse cycles, the residue may be combined with another fluid and can inadvertently be sprayed onto areas of the agricultural field.

In order to accurately monitor for, and detect, residue present within the sprayer, a residue detection system accurately detects a concentration of residue within the sprayer. In one example, upon determining that the concentration of residue is above an acceptable threshold, the residue detection system can either automatically or semi-automatically carry out additional rinse cycles or inform the operator of the detected residue.

Figure 1:
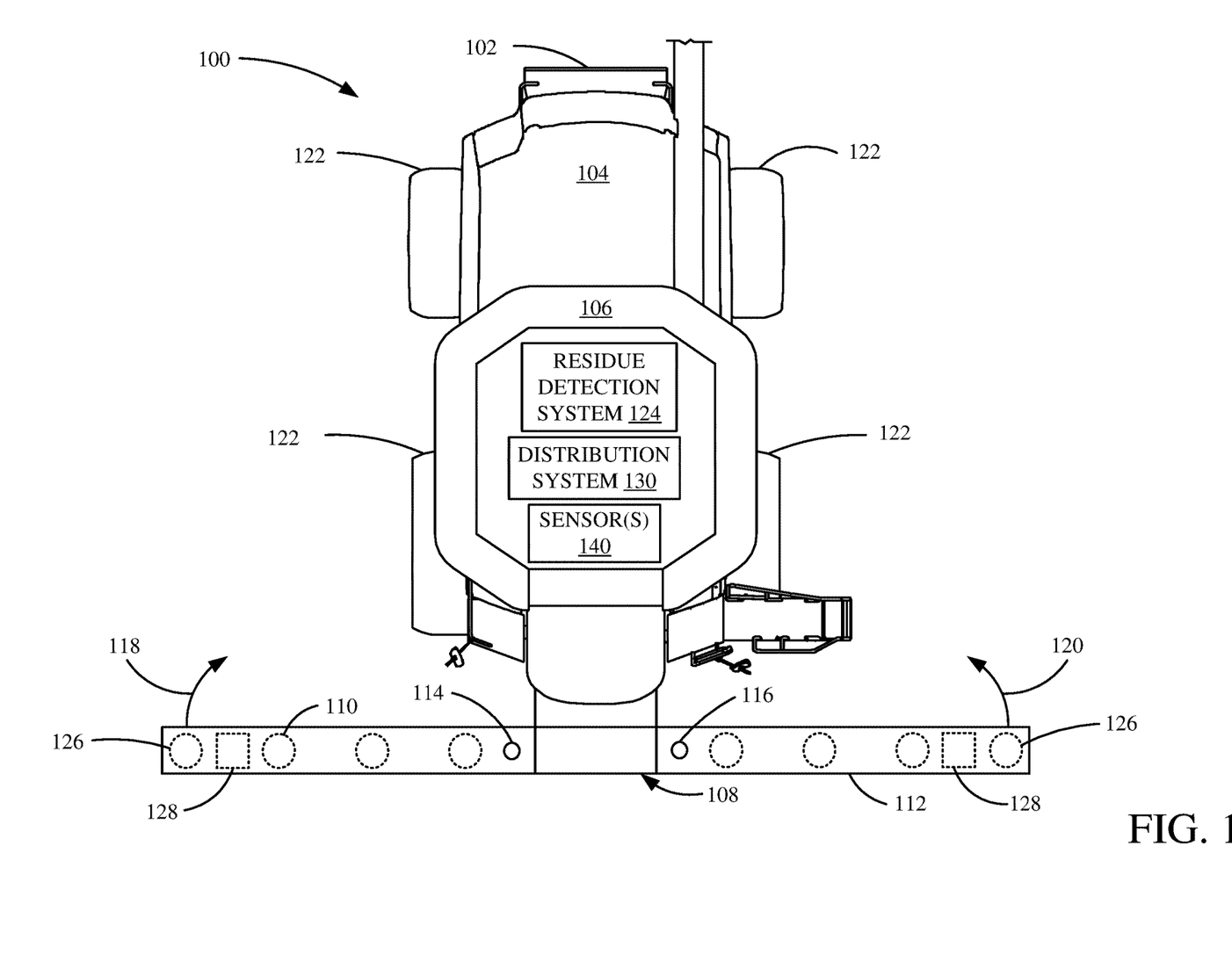
FIG. 1 is a pictorial illustration showing one example of an agricultural spraying machine.

FIG. 1 is a pictorial illustration showing one example of an agricultural spraying machine (or sprayer) 100. Sprayer 100 illustratively includes an engine in engine compartment 102, an operator's compartment 104, a tank 106, that stores material to be sprayed, an articulated boom 108 with nozzle(s) 126, a residue detection system 124, sensor(s) 140 and 128, and a distribution system 130 configured to disperse material through nozzle(s) 126. Additionally, agricultural sprayer 100 is supported for movement by a set of traction elements, such as wheels 122. The traction elements can also be tracks, or other traction elements as well.

Tank 106 can include one or more tanks that, in one example, includes a chemical tank that holds a chemical fluid to be sprayed at a worksite and a rinse fluid tank that holds rinse fluid. In operation, pump(s) of distribution system 130 can pump the rinse fluid from the rinse fluid tank through a fluidic pathway, extending along boom 108, and either through nozzle(s) 126 or back into the rinse tank. This will be discussed with respect to FIG. 2.

Boom 108 includes arms 110 and 112 which can articulate or pivot about points 114 and 116 to a storage position. In one example, a storage position can include pivoting arms 110 and 112 inward as indicated by arrows 118 and 120, respectively. In operation, residue detection system 124 receives sensor signals from any or all sensor(s) 140 and 128 and detects a presence of chemical residue within sprayer 100. This is described in greater detail below with respect to FIG. 2.

Figure 2:
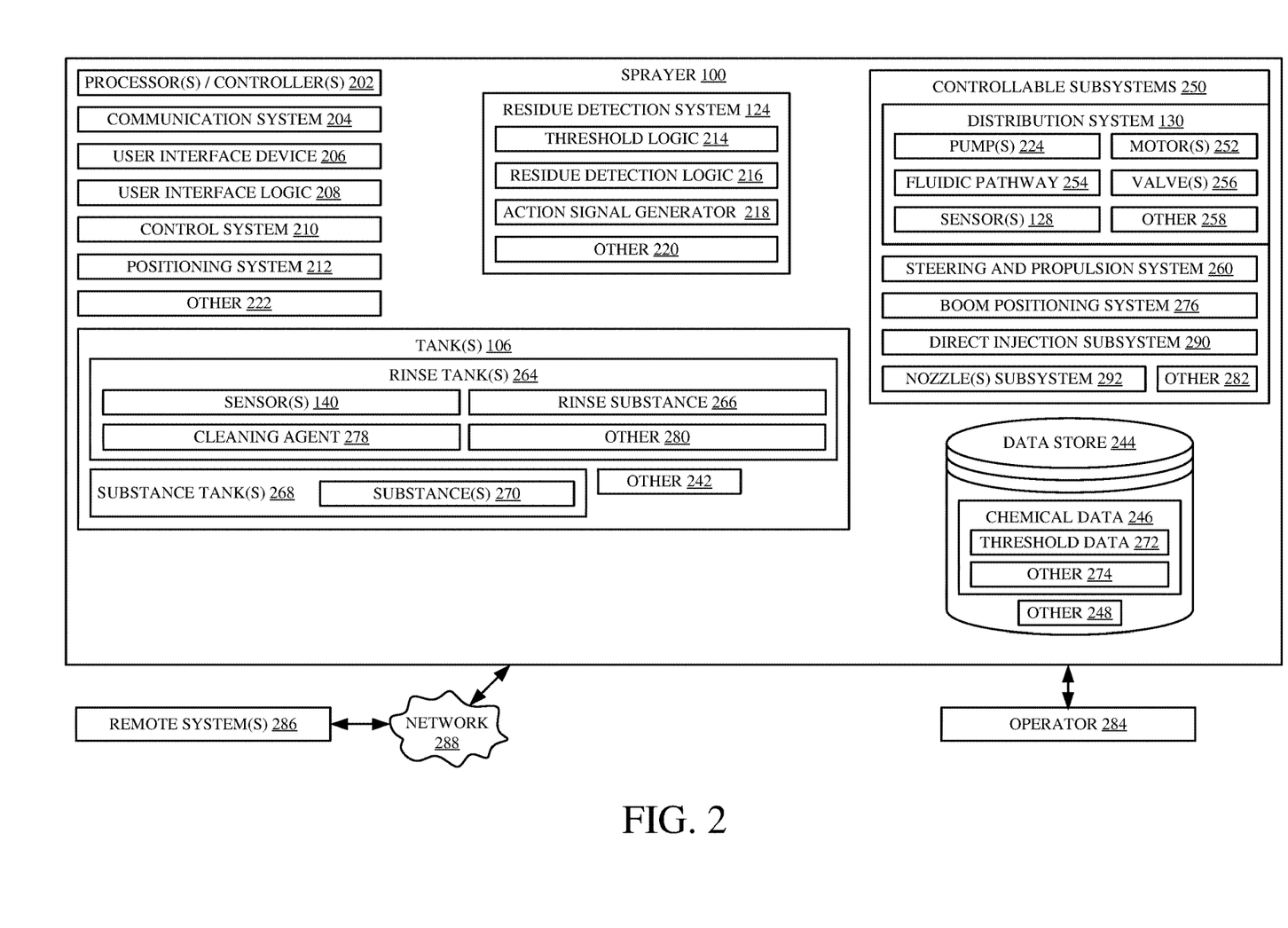
FIG. 2 is a block diagram of a sprayer communicatively coupled to a remote system over a network.

FIG. 2 is a block diagram of a sprayer communicatively coupled to a remote system 286 over a network 288. Before describing the operation of residue detection system 124 in more detail, a brief description of some of the items in sprayer 100 and their operation, will first be provided. Network 288 can be any of a wide variety of different types of networks, such as a wide area network, a local area network, a near field communication network, a cellular network, or any of a wide variety of other networks or combinations of networks. Remote system(s) 286 can include a wide variety of different remote systems (or a plurality of remote systems) including a remote computing system accessible by the other items in FIG. 2 (e.g., by residue detection system 124, etc.).

Sprayer 100 illustratively includes processor(s)/controller(s) 202, a communication system 204, user interface device(s) 206, user interface logic 208, a control system 210, a positioning system 212, data store 244, residue detection system 124, tank(s) 106 and controllable subsystem(s) 250. Control system 210 can generate control signals for controlling a variety of different controllable subsystem(s) 250 based on sensor signals generated by sensor(s) 140 and 128, based on feedback received from residue detection system 124 and/or remote system(s) 286, based on operator inputs received by an operator 284 through user interface device(s) 206, or it can generate control signals in a wide variety of other ways as well.

Controllable subsystem(s) 250 can include a wide variety of mechanical, electrical, hydraulic, pneumatic, computer implemented and other systems of sprayer 100 that relate to the movement of the machine, the operation that is performed, and other controllable features. In one example, this includes distribution system 130, steering and propulsion system 260, nozzle(s) subsystem 292, boom positioning system 276, direct injection subsystem 290, among a variety of other subsystem(s) 282. In one example, boom positioning system 276 controls a position of boom 108. Direct injection subsystem 290 controls a variation of concentration of spray adjuvants. Nozzle(s) subsystem 292 controls a characteristic of nozzle 126 being used on sprayer 100, and steering and propulsion system 260 controls a direction and speed of travel of sprayer 100.

Distribution system 130 moves fluid from tank(s) 106 through nozzle(s) 126 of boom 108. In one example, distribution system 130 includes pump(s) 224, motor(s) 252, valve(s) 256, a fluidic pathway 254, sensor(s) 128, among a variety of other components. In one example, fluidic pathway 254 can extend from tank(s) 106 to nozzle(s) 126 and, in some examples, back to tank(s) 106. Upon receiving a control signal from control system 210, motor(s) 252 can drive pump(s) 224 to pump fluid along fluidic pathway 254 through nozzle(s) 126 or, alternatively, back into tank(s) 106. In one example, a pathway of fluid can be altered based on a position of valve(s) 256 within fluidic pathway 254. For example, if valve(s) 256 are closed, a fluid, or combination of fluids, may be re-cycled through boom 108 and back into tank(s) 106. Alternatively, if valve(s) 256 are open, the fluid can be pumped along fluidic pathway 254 and dispersed out of nozzle(s) 126.

Sensor(s) 128 may be the same as, or different than, sensor(s) 140 and can include a wide variety of sensor(s) configured to measure a characteristic of fluid present in fluidic pathway 254. For instance, sensor(s) 128 can include conductivity sensor(s), spectral analysis-based sensor(s), fluoroscopy-based sensor(s), fluorescent tracer-based sensor(s), electrochemical/immunoassay-based sensor(s), ion-based sensor(s), PH/ORP-based sensor(s), etc. In one example, sensor(s) 128 can be located within fluidic pathway 254 along boom 108 and/or a recirculation pathway back to tank 106. However, these are examples only and it is contemplated that sensor(s) 128 may be located in a variety of other locations along fluidic pathway 254 or in tank 106. Additionally, one or more sensor(s) 128 can be located at multiple locations along fluidic pathway 254. In this example, received sensor signal(s) from multiple sensor(s) 128 located, along fluidic pathway 254, can be combined to get the residue concentration as well.

Communication system 204 can include one or more communication systems that allow sprayer 100 to communicate with remote system(s) 286 over network 288. Additionally, communication system 204 can include communication systems that allow components of sprayer 100 to communicate with each other that, in one example, includes residue detection system 124. User interface device 206 can include display devices, mechanical or electrical devices, audio devices, haptic devices, and a variety of other devices. In one example, user interface logic 208 generates an operator display on user interface device 206 which can include a display device that is integrated into operator compartment 104 within sprayer 100, or it can be a separate display on a separate device that can be carried by operator 284 (such as a laptop computer, a mobile device, etc.). Positioning system 212 can be one or more of a global positioning system (GPS) receiver, a LORAN system, a dead reckoning system, a cellular triangulation system, or other positioning system.

Tank(s) 106 carry a fluid to be sprayed and includes rinse tank(s) 264, substance tank(s) 268 and other tank(s) 242. Rinse tank(s) 264 includes a rinse substance 266, a cleaning agent 278, sensor(s) 140 among a variety of other items 280. In operation, during a rinse cycle, cleaning agent 278 can be mixed with rinse substance 266 and can be pumped from rinse tank(s) 264 through nozzle(s) 126 or, alternatively, through fluidic pathway 254 and back to rinse tank(s) 264. Rinse substance 266 can include water or a variety of other substances. Additionally, cleaning agent 278 can include soap among a variety of other cleaning agents that are mixed with rinse substance 266 prior to being pumped through nozzle(s) 126.

In one example rinse cycle operation, valve(s) 256 are controlled so that rinse substance 266 is mixed with cleaning agent 278 and is pumped from rinse tank(s) 264, along fluidic pathway 254 within boom 108, and back to rinse tank(s) 264. By recirculating rinse substance 266 with cleaning agent 278, excess residue within boom 108 can be removed prior to an additional spraying operation. Additionally, rinse substance 266 with cleaning agent 278 can be recirculated any number of times within sprayer 100 during a rinse cycle operation. After recirculating rinse substance 266 with cleaning agent 278 through fluidic pathway 254 one or more times, the mixture can be pumped through nozzle(s) 126.

Sensor(s) 140 can include conductivity sensor(s), spectral analysis-based sensor(s), fluoroscopy-based sensor(s), fluorescent tracer-based sensor(s), electrochemical/immunoassay-based sensor(s), ion-based sensor(s), PH/ORP sensor(s) among a variety of other sensor(s). In operation, sensor(s) 140 can be coupled proximate to rinse tank(s) 264 and can measure a characteristic of fluid present within tank(s) 106. For instance, one of the sensor(s) 140 can be coupled to sense liquid within the fluidic pathway 254 after the liquid is pumped through the system during a recirculation operation and just before the fluid re-enters the rinse tank 264. This is just one example. Upon sensing a characteristic of the fluid, sensor(s) 140 can generate sensor signals for residue detection system 124. This will be discussed in more detail later with respect to residue detection system 124. Additionally, one or more sensor(s) 140 can be located proximate to rinse tank(s) 264. In this example, received sensor signal(s) from multiple sensor(s) 140 located, proximate rinse tank 264, can be combined to determine the characteristic of fluid present within tank(s) 106. Substance tank(s) 268 can include one or more substances 270 to be sprayed on an agricultural field. This can include a wide variety of substances depending on a desired spraying operation.

Sprayer 100 also illustratively includes data store 244. Data store 244 can store any or all data pertaining to an operation of sprayer 100. Additionally, data store 244 can store chemical data 246 for a variety of fluids, among a variety of other data 248. In one example, chemical data 246 includes threshold data 272 for a variety of fluids, among a variety of other data 248. Threshold data 272 can be indexed for different fluids and can indicate different thresholds of residue that are acceptable, under different circumstances, prior to conducting a spraying operation with a new fluid. For example, residue detection system 124 can determine a presence of residue within boom 108, and, based on the determined presence, can access threshold data 272 to determine whether the amount of residue, of the given substance, present within boom 108 is acceptable for the next spraying operation to be performed.

Now turning to residue detection system 124, residue detection system 124 includes threshold logic 214, residue detection logic 216, action signal generator 218 among a variety of other components 220. Residue detection logic 216 is configured to receive sensor signals from sensor(s) 128 and 140 and determine a concentration of residue within sprayer 100. Upon determining a concentration of residue, residue detection logic 216 generates a concentration output for threshold logic 214 indicative of the determined concentration.

However, in another example, residue detection logic 216 can receive sensor signals exclusively from sensor(s) 128 during or after each rinse cycle, and, based on a change in sensor signals over time, can generate an output indicative of a presence or absence of residue within sprayer 100. For example, residue detection logic 216 can receive sensor signals from sensor(s) 128 prior to carrying out a rinse cycle operation to obtain a baseline value. A rinse cycle operation can then be carried out in which residue detection logic 216 receives sensor signals from sensor(s) 128 after each rinse cycle. Based on a change in the received sensor signals after each rinse cycle, residue detection logic 216 can determine and generate an output indicative of a presence of residue within sprayer 100.

Threshold logic 214 receives the concentration output from residue detection system 124 and compares the determined concentration to a threshold value. In one example, a threshold value can be obtained from threshold data 272, received from a user input, or retrieved from remote system(s) 286. Based on the comparison, threshold logic 214 generates an output for action signal generator 218.

Action signal generator 218 generates action signals for one or more components within sprayer 100. In one example, this can include generating action signals for user interface logic 208 in order to generate a display on user interface device 206. The user interface display can include a recommendation suggesting additional rinse cycles prior to conducting an additional spraying operation with a new fluid. Additionally, this can also include automatically or semi-automatically generating action signals for control system 210 to carry out additional rinse cycles.

One example operation of residue detection system 124 will now be discussed in which sensor(s) 128 and 140 are conductivity sensor(s), but it is contemplated that sensor(s) 128 and 140 may be a variety of other sensor(s) as well. Additionally, while it will be discussed in regards to receiving sensor signals before and after a rinse cycle, it is contemplated that sensor signals can be received at any point during a rinse cycle as well. However, in this example, prior to conducting a rinse cycle, residue detection logic 216 receives sensor signals from conductivity sensor 140, coupled to rinse tank(s) 264, configured to measure a conductivity of rinse substance 266 within rinse tank(s) 264. In one example, a conductivity of rinse substance 266 can serve as a baseline or reference measurement. In another example, the baseline or reference value for the substance can be retrieved from memory or remote system 286.

After a rinse cycle operation is completed in which rinse substance 266 is pumped along fluidic pathway 254, residue detection logic 216 receives sensor signals from conductivity sensor 128, located along fluidic pathway 254, that indicates a conductivity of the fluid present within fluidic pathway 254. In one example, the fluid can include rinse substance 266 mixed with a previously sprayed substance. Using the sensor signals received from conductivity sensor(s) 128 and 140, residue detection logic 216 determines a concentration of residue present within the fluid, located within fluidic pathway 254, and generates a concentration output for threshold logic 214 indicative of the concentration.

Threshold logic 214, upon receiving the concentration output, obtains a threshold value from threshold data 272. Alternatively, in other examples, a threshold value can be provided from a user input as well. Once a threshold value is obtained, threshold logic 214 compares the determined concentration to the threshold value. In one example, threshold values can be specific to a sprayed fluid or a desired spraying operation. For example, different chemicals to be sprayed can have different thresholds for defining an acceptable concentration, given a subsequent spraying operation. One fluid can have an acceptable concentration of 0.1 percent for a certain subsequent spraying operation, while a different fluid can have an acceptable concentration of 1 percent for the same subsequent spraying operation. The acceptable concentration (and hence threshold) may vary based on the chemicals being used, the spraying operations being performed, the crops, the time of year, etc.

Based on the comparison of the concentration value to the threshold value, threshold logic 214 generates an output for action signal generator 218. Action signal generator 218, in response to the received output, generates action signals for one or more components of sprayer 100. This can include generating an action signal for user interface logic 208 to generate a display indicating the presence and/or concentration of the residue. Additionally, this can include a recommendation for additional rinse cycles. Alternatively, action signal generator 218 can generate action signals for control system 210 to either automatically or semi-automatically carry out additional rinse cycles or perform other operations. In one example, action signal generator 218 can generate action signals to carry out any number of rinse cycles until a concentration of residue is below the threshold value or the residue is no longer present within fluidic pathway 254.

Figure 3:
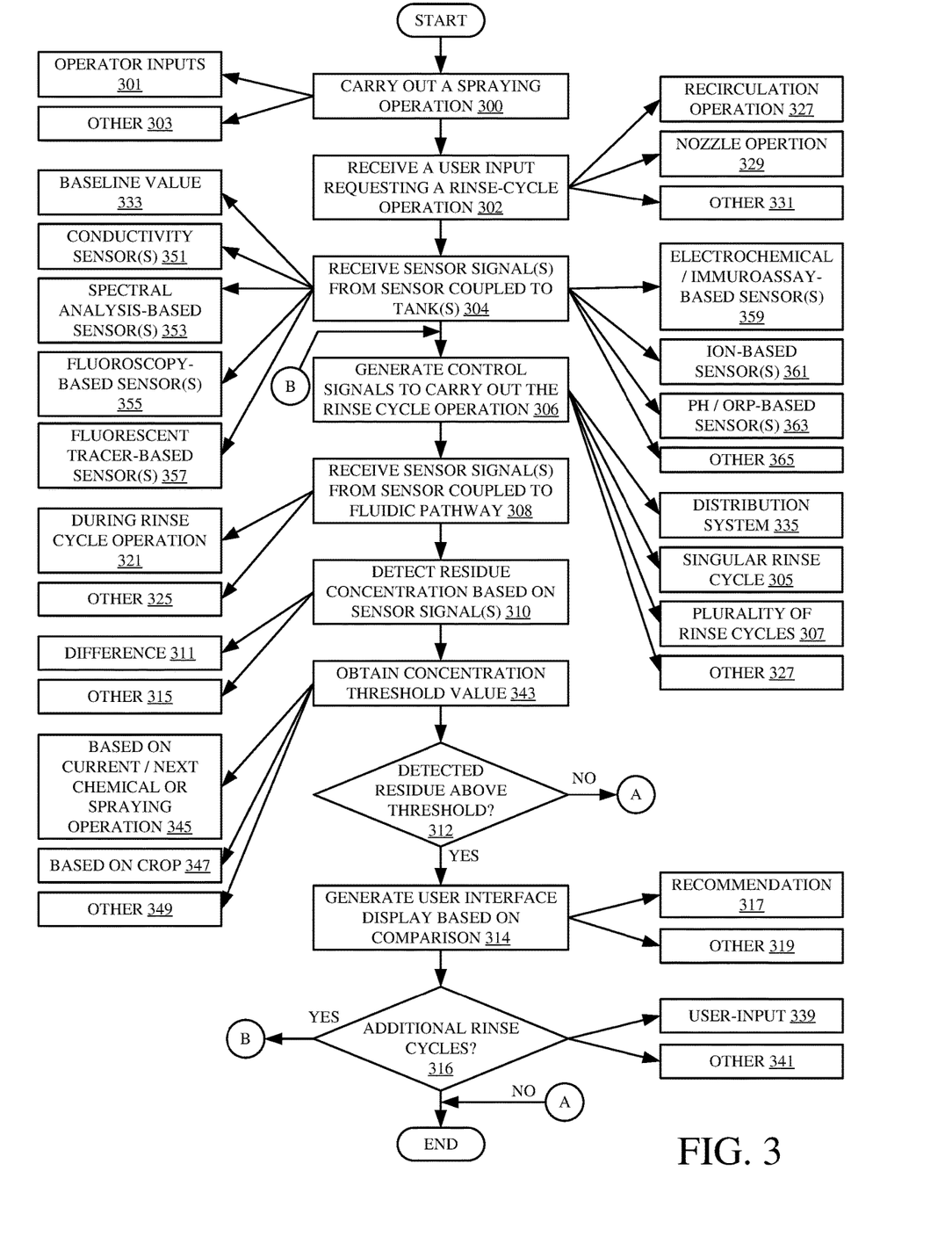
FIGS. 3-4 are flow diagrams showing example operations of a residue detection system illustrated in FIG. 2.
Figure 4:
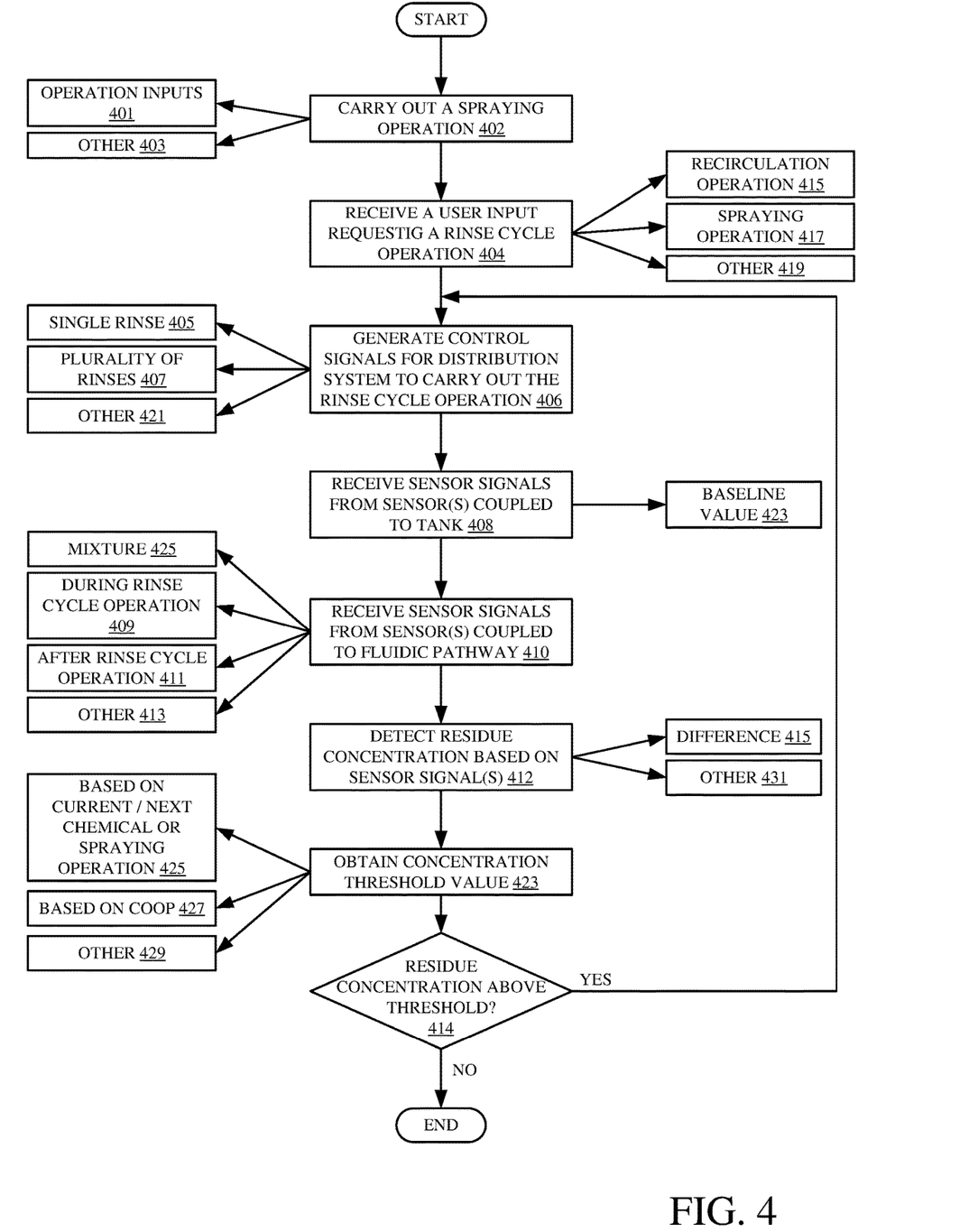

FIGS. 3-4 are flow diagrams showing example operations of a residue detection system illustrated in FIG. 2. The operation shown in FIG. 3 is one example of the operation of the system shown in FIG. 2 in detecting and determining a concentration of excess fluid (residue) within fluidic pathway 254 of sprayer 100 after completion of a spraying operation, and then informing the operator and allowing the operator to decide whether any additional rinse cycles are to be performed. FIG. 4 is an example in which additional rinse cycles are automatically performed. Additionally, it is to be understood that either type of operation can be carried out at any time during operation of sprayer 100 in which a presence of residue is to be detected.

Additionally, while FIGS. 3-4 utilize both sensor(s) 128 and 140 to detect a presence of residue within sprayer 100, in other examples, only sensor(s) 128 may be used to detect a presence of residue within sprayer 100. In this example, a presence of residue can be determined based on a change in sensor signals received exclusively from sensor(s) 128 after each rinse cycle. In this example, no baseline value is obtained from sensor(s) 140, and only a change in sensor signals from sensor(s) 128 is monitored to identify a presence of residue. The change in sensor signals after each rinse cycle may then be compared to a threshold value to determine a presence of residue. Furthermore, in this example, additional rinse cycles may be automatically or semi-automatically carried out until a change in sensor signals received from sensor(s) 128 is below a threshold value.

It is initially assumed that sprayer 100 just finished carrying out a spraying operation. In one example, a spraying operation can be carried out based on received operator inputs, as indicated by block 301, or a variety of other inputs as indicated by block 303. Upon completion of the spraying operation, processing turns to block 302 where a user input is received commanding a rinse cycle operation for sprayer 100. In one example, a rinse cycle operation includes a recirculation operation that includes using pump(s) 224 to pump a mixture of rinse substance 266 and cleaning agent 278 from tank(s) 106, along fluidic pathway 254 extending across boom 108, and back to tank(s) 106 as indicated by block 327. This recirculation can be repeated one or more times, depending on the rinse cycle operation, before the rinsing liquid is discharged from the system through nozzle(s) 126. Alternatively, a rinse cycle operation can include using pump(s) 224 to pump a mixture of rinse substance 266 and cleaning agent 278 from tank(s) 106, along fluidic pathway 254, directly through nozzle(s) 126 as indicated by block 329, without recirculating it. However, other rinse cycle operations are contemplated as well, as indicated by block 331.

Upon receiving a user input requesting a rinse cycle, processing turns to block 304 where residue detection logic 216 receives sensor signal(s) from sensor(s) 140 coupled to rinse tank(s) 264. Sensor(s) 140 can include conductivity sensor(s), as indicated by block 351, spectral analysis-based sensor(s), as indicated by block 353, fluoroscopy-based sensor(s), as indicated by block 355, fluorescent tracer-based sensor(s), as indicated by block 357, electrochemical/immunoassay-based sensor(s), as indicated by block 359, ion-based sensor(s), as indicated by block 361, PH/ORP-based sensor(s), as indicated by block 363, among a variety of other sensor(s) as indicated by block 365. In one example, residue detection logic 216 can measure a characteristic of rinse substance 266 or other fluid within rinse tank(s) 264 using sensor signal(s) received from sensor(s) 140 to use as a baseline value as indicated by block 333.

Processing then turns to block 306 where control system 210 generates control signals to carry out the rinse cycle operation. In one example, the generated control signals can be generated for distribution system 130 to carry out the rinse cycle operation. However, other control signals can be generated for a variety of other components and systems as indicated by block 337. Additionally, control signals can be generated for a singular rinse cycle, as indicated by block 305, or for a plurality of rinse cycles as indicated by block 307.

Upon completion of the rinse cycle(s), processing turns to block 308 where residue detection logic 216 receives sensor signal(s) from sensor(s) 128 located along fluidic pathway 254. Sensor(s) 128 can be the same or different than sensor(s) 140. Additionally, in other examples, residue detection logic 216 can receive sensor signal(s) from sensor(s) 128 during the rinse cycle operation, as indicated by block 321, or at a variety of other times as indicated by block 325.

Based on the received sensor signals from sensor(s) 128 and 140, residue detection logic 216 determines a presence and concentration of residue within sprayer 100 as indicated by block 310. In one example, a concentration and presence of residue can be determined based on a difference between the sensor signals, as indicated by block 311, or can be determined a variety of other ways as well as indicated by block 315. For example, a received sensor signal from sensor(s) 140 can indicate a characteristic of a fluid within tank(s) 106 and can be used as a baseline value, and, based on a difference between the baseline value and a measured characteristic of fluid within fluidic pathway 254, a concentration of residue can be determined using residue detection logic 216. In another example, the baseline value of the sensed characteristic may be predefined (such as input by an operator, retrieved from a remote or local data store, etc.). The value of the sensed characteristic can then be compared to the baseline characteristics to identify the difference. In yet another example, no baseline comparison is used. Instead, the value of the sensed characteristic is detected by the sensor(s) and that value (instead of a comparison value) is used in further processing. A concentration output is provided to threshold logic 214, and is indicative of the determined concentration.

Threshold logic 214, upon receiving the concentration output from residue detection logic 216, obtains a concentration threshold value from threshold data 272 within data store 244 as indicated by block 343. The concentration value can be obtained based on a current or next chemical spraying operation, as indicated by block 345, a type of crop, as indicated by block 347, or a variety of other factors as indicated by block 349. Additionally, in some examples, a concentration threshold value can be provided from a user input as well. Upon obtaining the concentration threshold value, threshold logic 214 determines if the measured concentration exceeds the concentration threshold value for a given fluid, as indicated by block 312.

If the determined concentration is below the threshold value, processing subsequently ends. If a measured concentration exceeds the threshold value, processing proceeds to block 314 where action signal generator 218 generates action signals for user interface logic 208 to generate a user interface display. In one example, a generated user interface display can include a recommendation for operator 284 indicating a concentration of the residue and a recommendation to carry out additional rinse cycles. However, a variety of other information may be displayed to operator 284 as indicated by block 319.

If a user interface display is generated for operator 284, processing turns to block 316 where action signal generator 218 determines whether to generate action signals for control system 210 to carry out additional rinse cycle(s). In one example, a determination can be based on a received user input, as indicated by block 339, or a variety of other inputs as indicated by block 341. If additional rinse cycle(s) are desired, processing turns to block 306 where action signal generator 218 generates action signals for control system 210 to carry out the additional rinse cycle(s). If no additional rinse cycles are performed, processing subsequently ends.

FIG. 4 is one example operation of using control system 210 to generate control signals for sprayer 100 based on a detected concentration of residue present within boom 108, to automatically perform extra rinse cycles when the remaining residue concentration is too high. It is initially assumed that sprayer 100 just finished carrying out a spraying operation as indicated by block 402. In one example, a spraying operation can be carried out based on received operator inputs, as indicated by block 401, or a variety of other inputs as indicated by block 403. Upon completion of the spraying operation, processing turns to block 404 where a user input is received requesting a rinse cycle operation for sprayer 100. A rinse cycle operation can include a recirculation operation of rinse substance 266 and cleaning agent 278, as indicated by block 415, a spraying operation of rinse substance 266 and cleaning agent 278 through nozzle(s) 126 of sprayer 100, as indicated by block 417, or a variety of other rinse cycle operations as indicated by block 419.

Once operator 284 provides the user input requesting a rinse cycle operation, processing turns to block 406 where control system 210 generates control signals for distribution system 130 to carry out the rinse cycle operation. However, control signals can also be generated for a variety of other systems and components of sprayer 100 as indicated by block 421. In one example, control signals can be generated by control system 210 to carry out a singular rinse cycle operation, as indicated by block 405, or a plurality of rinse cycle operations as indicated by block 407.

Once the rinse cycle operation is completed, processing turns to block 408 where residue detection logic 216 receives sensor signal(s) from sensor(s) 140 coupled to tank(s) 106. Based on the received sensor signal(s), residue detection logic 216 can measure a characteristic of a fluid within tank(s) 106 that, in one example, can be used as a baseline measurement as indicated by block 423. As mentioned above, the baseline can be predetermined, or in another example, no baseline is used.

Additionally, residue detection logic 216 receives sensor signal(s) from sensor(s) 128, coupled to fluidic pathway 254, configured to measure a characteristic of fluid present within fluidic pathway 254 as indicated by block 410. In one example, a fluid within fluidic pathway 254 can include a mixture of rinse substance 266 and a previously sprayed fluid as indicated by block 425. However, in other examples, sensor signal(s) can be received from sensor(s) 128 and 140 during or after the rinse cycle operation, as indicated by blocks 409 and 411, respectively, or at other points as indicated by block 413.

Based on the received sensor signal(s) from sensor(s) 128 and 140, residue detection logic 216 determines a residue concentration present within a fluid located within fluidic pathway 254 as indicated by block 412. In one example, a residue concentration can be calculated based on a difference between a baseline value obtained from sensor(s) 140 and a measured value obtained from sensor(s) 128, as indicated by block 415. Or, the residue concentration can be determined based on the sensor signal 128 alone. For instance, a mapping between sensor signal values and substance concentrations can be stored for each substance to be sprayed. Once the sensor signal value is obtained, the mapping can be accessed to identify the residue concentration for that substance. However, other ways of determining a residue concentration using the sensor signal(s) are contemplated as well, as indicated by block 431.

Once a residue concentration is determined, a concentration output is provided from residue detection logic 216 to threshold logic 214 indicative of the determined concentration. Threshold logic 214, upon receiving the concentration output, obtains a concentration threshold value from threshold data 272 within data store 244 as indicated by block 423. The concentration value can be obtained based on a current or next chemical spraying operation, as indicated by block 425, a type of crop, as indicated by block 427, or a variety of other factors as indicated by block 429 such as a type of fluid. Additionally, in some examples, a concentration threshold value can be provided from a user input as well. Upon obtaining the concentration threshold value, threshold logic 214 determines if the measured concentration exceeds the concentration threshold value for a given fluid, as indicated by block 414.

If the determined concentration of the residue is greater than the threshold value, processing automatically reverts back to block 406 where action signal generator 218 generates action signals for control system 210 to automatically carry out additional rinse cycle operations. By automatically, it is meant that the system performs the operation without additional operator input, except perhaps to initiate or authorize the operation. If the determined concentration is less than the threshold value, processing subsequently ends.

Figure 5:
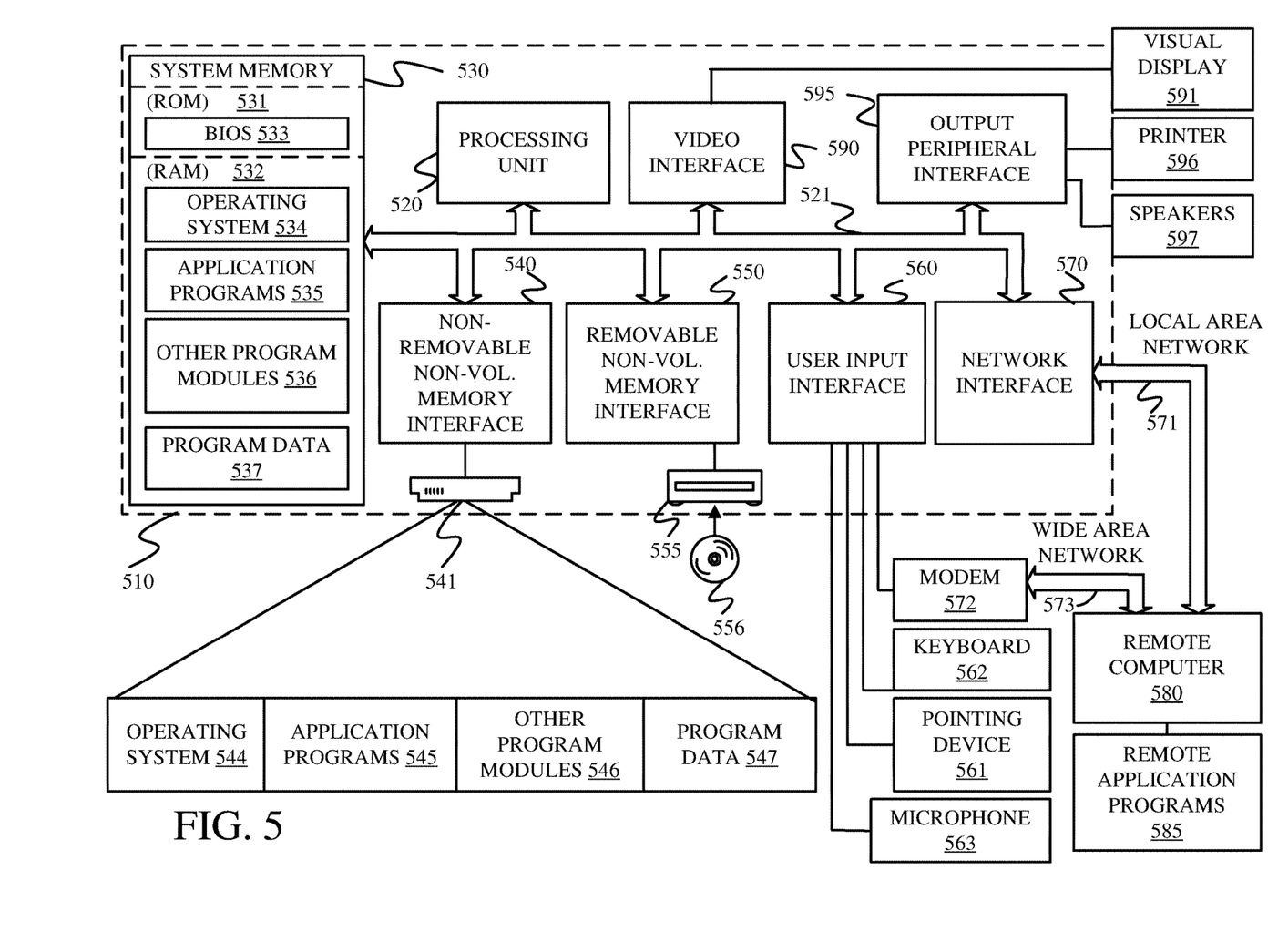
FIG. 5 is a block diagram showing one example of a computing environment that can be used in the architecture illustrated in previous FIGS.

FIG. 5 is one embodiment of a computing environment in which elements of FIG. 2, or parts of it, (for example) can be deployed. With reference to FIG. 5, an example system for implementing some embodiments includes a general-purpose computing device in the form of a computer 510. Components of computer 510 may include, but are not limited to, a processing unit 520 (which can comprise processors or servers from other FIGS.), a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. Memory and programs described with respect to FIG. 2 can be deployed in corresponding portions of FIG. 5.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable volatile/nonvolatile computer storage media. By way of example only, FIG. 5 illustrates a hard disk drive 541 that reads from or writes to non-removable, nonvolatile magnetic media, an optical disk drive 555, and nonvolatile optical disk 556. The hard disk drive 541 is typically connected to the system bus 521 through a non-removable memory interface such as interface 540, and optical disk drive 555 are typically connected to the system bus 521 by a removable memory interface, such as interface 550.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537.

A user may enter commands and information into the computer 510 through input devices such as a keyboard 562, a microphone 563, and a pointing device 561, such as a mouse, trackball or touch pad. Other input devices (not shown) may include foot pedals, steering wheels, levers, buttons, a joystick, game pad, satellite dish, scanner, or the like. These and other input devices are often connected to the processing unit 520 through a user input interface 560 that is coupled to the system bus, but may be connected by other interface and bus structures. A visual display 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 is operated in a networked environment using logical connections (such as a local area network—LAN, or wide area network WAN) to one or more remote computers, such as a remote computer 580.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. In a networked environment, program modules may be stored in a remote memory storage device. FIG. 5 illustrates, for example, that remote application programs 585 can reside on remote computer 580.

It should also be noted that the different examples described herein can be combined in different ways. That is, parts of one or more examples can be combined with parts of one or more other examples. All of this is contemplated herein.

Example 1 is a mobile agricultural sprayer configured to spray a substance at a worksite, comprising:
a chemical tank that holds a chemical fluid to be sprayed at the worksite;
a rinse fluid tank that holds rinse fluid;
a first sensor coupled to the rinse fluid tank configured to detect a characteristic of the rinse fluid within the rinse fluid tank, and, generate a first sensor signal indicative of the characteristic of the rinse fluid;
a distribution system, including a fluidic pathway and a nozzle, configured to pump the rinse fluid from the rinse fluid tank along the fluidic pathway through the nozzle of the sprayer;
a second sensor coupled to the fluidic pathway configured to detect a characteristic of the fluid within the fluidic pathway, and generate a second sensor signal indicative of the characteristic; and
a residue detection system configured to receive the first and second sensor signals and, based on the received sensor signals, determine a concentration of residue within the fluidic pathway.

Example 2 is the mobile agricultural sprayer of any or all previous examples wherein the residue comprises a chemical substance present within the fluidic pathway from a completed spraying operation and the rinse fluid comprises a rinse substance configured to be pumped along the fluidic pathway during a rinse operation.

Example 3 is the mobile agricultural sprayer of any or all previous examples wherein the first and second sensors are conductivity sensors and the detected characteristic comprises a conductivity of the fluid.

Example 4 is the mobile agricultural sprayer of any or all previous examples wherein the residue detection system comprises:
residue detection logic configured to receive the first and second sensor signals, determine the concentration of residue within the fluidic pathway and generate a concentration output indicative of the concentration.

Example 5 is the mobile agricultural sprayer of any or all previous examples wherein the residue detection system comprises:
threshold logic configured to receive the concentration output from the residue detection logic, compare the concentration output to a threshold value, and, based on the comparison, generate a threshold output.

Example 6 is the mobile agricultural sprayer of any or all previous examples and further comprising:
a datastore comprising threshold data, and wherein the threshold logic is configured to obtain the threshold value from the threshold data within the data store of the mobile agricultural sprayer, the threshold data being specific to the chemical fluid.

Example 7 is the mobile agricultural sprayer of any or all previous examples wherein the residue detection system comprises:
an action signal generator configured to receive the threshold output from the threshold logic, and, based on the received threshold output, generate an action signal.

Example 8 is the mobile agricultural sprayer of any or all previous examples wherein the mobile agricultural sprayer comprises:

user interface logic configured to receive the action signal, and, upon receiving the action signal from the action signal generator, generate a user interface display on a user interface device.

Example 9 is the mobile agricultural sprayer of any or all previous examples wherein the user interface logic is configured to generate the user interface display with a recommendation for an operator of the mobile agricultural sprayer to conduct a rinse cycle operation.

Example 10 is the mobile agricultural sprayer of any or all previous examples wherein the mobile agricultural sprayer comprises:

a control system configured to receive the action signal, and, upon receiving the action signal, generate control signals for the distribution system to automatically carry out a rinse cycle operation.

Example 11 is the mobile agricultural sprayer of any or all previous examples and further comprising:

a boom defining the fluidic pathway and wherein the rinse cycle operation comprises pumping the fluid from the tank through the boom of the agricultural sprayer and back to the tank.

Example 12 is a method of determining a concentration of chemical residue present within a mobile agricultural sprayer, comprising:

detecting a characteristic of a rinse fluid present within a rinse tank of the mobile agricultural sprayer;

receiving a first sensor signal indicative of the detected characteristic;

detecting a characteristic of a fluid present within a fluidic pathway between the rinse tank and a spray nozzle of the mobile agricultural sprayer;

receiving a second sensor signal indicative of the detected characteristic of the fluid in the fluidic pathway; and determining the chemical residue concentration in the fluid present within the fluidic pathway based on the first and second sensor signals.

Example 13 is the method of any or all previous examples and further comprising:

comparing the chemical residue concentration to a threshold value obtained from threshold data and, based on the comparison, generating action signals to control a controllable subsystem of the mobile agricultural sprayer.

Example 14 is the method of any or all previous examples and further comprising:

generating a user interface display on a user interface device based on the generated action signals, the user interface display comprising a recommendation to carry out a rinse cycle.

Example 15 is the method of any or all previous examples and further comprising:

generating control signals for a distribution system to automatically carry out a rinse cycle operation comprising pumping the rinse fluid from the rinse tank along the fluidic pathway and back into the rinse tank.

Example 16 is the method of any or all previous examples wherein detecting a characteristic of the rinse fluid within the rinse tank comprises detecting a conductivity of the rinse fluid within the rinse tank, and wherein detecting a characteristic of fluid within the fluidic pathway comprises detecting a conductivity of the fluid in the fluidic pathway.

Example 17 is a mobile agricultural sprayer comprising:

a chemical tank configured to hold a chemical fluid to be sprayed on a field;

a rinse tank configured to hold a rinse fluid;

a pump configured to pump the rinse fluid from the rinse tank along a fluidic pathway through the nozzles of the mobile agricultural sprayer;

a first sensor coupled to the rinse tank configured to measure a characteristic of the fluid within the rinse tank and generate a first sensor signal indicative of the characteristic;

a second sensor coupled to the fluidic pathway configured to measure a characteristic of fluid in the fluidic pathway and generate a second sensor signal indicative of the characteristic; and a residue detection system configured to receive the first and the second sensor signals, and, based on the received signals, determine a chemical residue concentration within the fluidic pathway.

Example 18 is the mobile agricultural sprayer of any or all previous examples wherein the residue detection system comprises:

threshold logic configured to receive a concentration output indicative of the chemical residue concentration, compare the chemical residue concentration to a threshold value, and, based on the comparison, generate a threshold output.

Example 19 is the mobile agricultural sprayer of any or all previous examples wherein the residue detection system comprises:

an action signal generator configured to receive the threshold output from the threshold logic, and, based on the received threshold output, generate action signals to control at least one subcomponent of the mobile agricultural sprayer.

Example 20 is the mobile agricultural sprayer of any or all previous examples wherein the action signal generator is configured to generate action signals to control the pump to pump the rinse fluid along the fluidic pathway through the nozzles of the mobile agricultural sprayer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile agricultural sprayer comprising:
 a chemical tank that holds a chemical to be sprayed at a worksite;
 a rinse fluid tank that holds rinse fluid that is different from the chemical in the chemical tank;
 a first sensor disposed within the rinse fluid tank and configured to generate a first sensor signal indicative of a detected characteristic of the rinse fluid within the rinse fluid tank;
 a distribution system, including a fluidic pathway and a nozzle through which the chemical is pumped to complete a spraying operation at the worksite, wherein the distribution system is configured to perform a first rinsing operation that pumps the rinse fluid from the rinse fluid tank along the fluidic pathway to rinse the fluidic pathway of residue of the chemical from the completed spraying operation;
 a second sensor coupled to the fluidic pathway and configured to generate a second sensor signal indicative of a detected characteristic of fluid in the fluidic pathway from the first rinsing operation; and a residue detection system configured to:
receive the first and second sensor signals;
determine, based on the first and second sensor signals, determine a concentration of residue of the chemical, from the completed spraying operation, present within the fluidic pathway; and
control the distribution system to pump the rinse fluid from the first rinsing operation back to the rinse tank or pump the rinse fluid from the first rinsing operation out of the fluidic pathway through a nozzle of the mobile agricultural sprayer, based on the concentration of residue of the chemical present within the fluidic pathway.

2. The mobile agricultural sprayer of claim 1, wherein the worksite comprises an agricultural field and the chemical comprises an agricultural chemical for crops to be harvested from the agricultural field.

3. The mobile agricultural sprayer of claim 1, wherein the first and second sensors are conductivity sensors configured to detect fluid conductivity.

4. The mobile agricultural sprayer of claim 1, wherein the residue detection system, comprises:
residue detection logic configured to receive the first and second sensor signals, determine the concentration of residue of the chemical from the chemical tank present within, the fluidic pathway, from the first rinsing operation, and, generate a concentration output indicative of the concentration.

5. The mobile agricultural sprayer of claim 4, wherein the residue detection system comprises:
threshold logic configured to receive the concentration output from the residue detection logic, compare the concentration output to a threshold value, and, based on the comparison, generate a threshold output.

6. The mobile agricultural sprayer of claim 5, and further comprising:
a datastore comprising threshold data, and wherein the threshold logic is configured to obtain the threshold value from the threshold data within the data store of the mobile agricultural sprayer, the threshold data being based on the chemical and a next spraying operation to be performed.

7. The mobile agricultural sprayer of claim 5, wherein the residue detection system comprises:
an action signal generator configured to receive the threshold output from the threshold logic, and, based on the received threshold output, generate an action signal.

8. The mobile agricultural sprayer of claim 7, wherein the mobile agricultural sprayer comprises:
user interface logic configured to receive the action signal, and, upon receiving the action signal from the action signal generator, generate a user interface display on a user interface device.

9. The mobile agricultural sprayer of claim 8, wherein the user interface logic is configured to generate the user interface display with a recommendation for an operator of the mobile agricultural sprayer to conduct a second rinsing operation.

10. The mobile agricultural sprayer of claim 7, wherein the mobile agricultural sprayer comprises:
a control system configured to receive action signal, and, upon receiving the action signal, generate control signals for the distribution system to automatically carry out a second rinsing operation.

11. The mobile agricultural sprayer of claim 9, wherein the second rinsing operation comprises pumping the rinse fluid from the first rinsing operation back to the rinse fluid tank through the fluidic pathway and pumping additional rinse fluid from the rinse tank through the fluidic pathway to further rinse the fluidic pathway of residue of the chemical from the completed spraying operation.

12. A method of controlling a mobile agricultural sprayer, the method comprising:
receiving a first sensor signal indicative of a detected characteristic of a rinse fluid present within a source of rinse fluid on the mobile agricultural sprayer;
performing a first rinse operation that pumps rinse fluid from the source of rinse fluid along a fluidic pathway carried by a boom to rinse the fluidic pathway of residue of a chemical from a completed spraying operation that sprayed the chemical at a worksite;
receiving a second sensor signal indicative of a detected characteristic of fluid in the fluidic pathway from the first rinse operation; and
determining, based on the first and second sensor signals, a concentration of residue of the chemical in the fluid present within the fluidic pathway from the completed spraying operation; and
selectively pumping the fluid present within the fluidic pathway front the first rinse operation back to the source of rinse fluid or out of the fluidic pathway through spray nozzles coupled to the fluidic pathway and disposed along the boom, based on the concentration of residue of the chemical in the fluid present within the fluidic pathway.

13. The method of claim 12 and further comprising:
comparing the determined concentration to a threshold value obtained from threshold data and, based on the comparison, generating action signals to control a controllable subsystem of the mobile agricultural sprayer.

14. The method of claim 13 and further comprising:
generating a user interface display on a user interface device based on the generated action signals, the user interface display comprising a recommendation to carry out a second rinse operation.

15. The method of claim 13 and further comprising:
generating control signals for the distribution system to automatically carry out the second rinse operation comprising pumping the rinse fluid present within the fluidic pathway from the first rinse operation back to the source of rinse fluid along the fluidic pathway carried by the boom and pumping additional rinse fluid from the source of rinse fluid along the fluidic pathway carried by the boom to further rinse the fluidic pathway of residue of the chemical from the completed spraying operation.

16. The method of claim 13, wherein detecting a characteristic of the rinse fluid within the rinse tank comprises detecting a conductivity of the rinse fluid within the rinse tank, and wherein detecting a characteristic of fluid within the fluidic pathway comprises detecting a conductivity of the fluid in the fluidic pathway.

17. A mobile agricultural sprayer comprising:
a chemical tank configured to hold a chemicalto be sprayed on a field during a spraying operation;
a rinse tank configured to hold a rinse fluid that is different from the chemical in the chemical tank;
a pump configured to pump the rinse fluid from the rinse tank along a fluidic pathway of the mobile agricultural sprayer to perform a rinsing operation that rinses the fluidic pathway of residue of the chemical from the spraying operation, wherein the fluidic pathway is carried by a boom of the mobile agricultural sprayer;

a first sensor coupled to the rinse tank and configured to measure a characteristic of the rinse fluid within the rinse tank and generate a first sensor signal, indicative of the characteristic;

a second sensor coupled to the fluidic pathway carried by the boom and configured to measure a characteristic of fluid in the fluidic pathway carried by the boom from the rinsing operation and generate a second sensor signal indicative of the characteristic; and a residue detection system configured to:
receive the first and the second sensor signals;
determine, based on the received signals, a concentration of residue of the chemical from the spraying operation within the fluidic pathway, and
control the pump to pump the rinse fluid from the first rinsing operation back to the rinse tank or pump the rinse fluid from the first rinsing operation out of the fluidic pathway through a nozzle of the mobile agricultural sprayer, based on the concentration of residue of the chemical present within the fluidic pathway.

18. The mobile agricultural sprayer of claim 17, wherein the residue detection system comprises:
threshold logic configured to receive a concentration output indicative of the chemical residue concentration, compare the chemical residue concentration to a threshold value, and, based on the comparison, generate a threshold output.

19. The mobile agricultural sprayer of claim 18, wherein the residue detection system comprises:
an action signal generator configured to receive the threshold output from the threshold logic, and, based on the received threshold output, generate action signals to control at least one subcomponent of the mobile agricultural sprayer.

20. The mobile agricultural sprayer of claim 19, wherein the action signal generator is configured to generate action signals to control the pump to pump the rinse fluid along the fluidic pathway through the nozzles of the mobile agricultural sprayer.

* * * * *